US012726835B2

(12) United States Patent
Khirallah et al.

(10) Patent No.: US 12,726,835 B2
(45) Date of Patent: Sep. 1, 2026

(54) METHOD AND APPARATUS FOR ENERGY PERFORMANCE POLICY

(71) Applicant: SAMSUNG ELECTRONICS CO., LTD., Suwon-si (KR)

(72) Inventors: Chadi Khirallah, Staines (GB); Erik Guttman, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 18/361,714

(22) Filed: Jul. 28, 2023

(65) Prior Publication Data

US 2024/0049006 A1 Feb. 8, 2024

(30) Foreign Application Priority Data

Jul. 30, 2022 (GB) .................................... 2211156

(51) Int. Cl.
*H04W 24/02* (2009.01)

(52) U.S. Cl.
CPC .................................. *H04W 24/02* (2013.01)

(58) Field of Classification Search
CPC .................................................... H04W 24/02
See application file for complete search history.

(56) References Cited

U.S. PATENT DOCUMENTS 10,159,002 B2 12/2018 Sergeyev et al.
2012/0030320 A1 2/2012 Diab et al.
2014/0304408 A1 10/2014 Rhee
2016/0029295 A1 1/2016 Nagasaka et al.
2018/0376384 A1 12/2018 Youn et al.
2020/0329428 A1 10/2020 Chou et al.
2023/0247548 A1* 8/2023 Qiao ................ H04W 52/0219 370/311

FOREIGN PATENT DOCUMENTS

CN 113596965 A 11/2021
EP 2566256 A1 3/2013
KR 10-2011-0070794 A 6/2011
KR 20120012763 A 2/2012
WO 2021091266 A1 5/2021

(Continued)

OTHER PUBLICATIONS

International Search Report and Written Opinion of the International Searching Authority dated Oct. 23, 2023, in connection with International Application No. PCT/KR2023/011038, 10 pages.

(Continued)

*Primary Examiner* — Curtis B Odom

(57) ABSTRACT

The disclosure relates to a 5G or 6G communication system for supporting a higher data transmission rate. A method of managing an energy performance policy, EPP, for a user equipment, UE, over a network interface of a network, for example a New Radio, NR, network such as a 5G NR network, the method comprising: sending, by the Core Network, CN, for example the Access and Mobility Management Function, AMF, thereof, assistance information on the EPP for the UE to an NG-RAN node and/or to the UE using signalling and/or messages; and managing the EPP for the UE.

12 Claims, 7 Drawing Sheets

(56) References Cited

FOREIGN PATENT DOCUMENTS

WO 2021244761 A1 12/2021

OTHER PUBLICATIONS

Combined Search & Examination Report dated Jan. 11, 2024, in connection with United Kingdom Patent Application No. GB2211156.1, 3 pages.
Supplementary European Search Report dated Sep. 9, 2024, in connection with European Patent Application No. 23837925.9, 10 pages.
Samsung, "A new solution for NWDAF-assisted RFSP policy," S2-2000798, SA WG2 Meeting #136AH, Incheon, South Korea, Jan. 13-17, 2020, 4 pages.
3GPP TR 21.905 V17.1.0 (Dec. 2021) Technical Report; 3rd Generation Partnership Project; Technical Specification Group Services and System Aspects; Vocabulary for 3GPP Specifications (Release 17); 65 pages.
3GPP TR 32.972 V17.0.0 (Apr. 2022) Technical Report; 3rd Generation Partnership Project; Technical Specification Group Services and System Aspects; Telecommunication management; Study on system and functional aspects of energy efficiency in 5G networks (Release 17); 30 pages.
3GPP TR 38.864 V0.0.2 (May 2022) Technical Report; 3rd Generation Partnership Project; Technical Specification Group Radio Access Network; Study on network energy savings for NR (Release 18); 9 pages.
3GPP TS 23.501 V17.5.0 (Jun. 2022) Technical Specification; 3rd Generation Partnership Project; Technical Specification Group Services and System Aspects; System architecture for the 5G System (5GS); Stage 2 (Release 17); 568 pages.
3GPP TS 38.331 V17.0.0 (Mar. 2022) Technical Specification; 3rd Generation Partnership Project; Technical Specification Group Radio Access Network; NR; Radio Resource Control (RRC) protocol specification (Release 17); 1221 pages.
3GPP TS 36.423 V17.0.0 (Apr. 2022) Technical Specification; 3rd Generation Partnership Project; Technical Specification Group Radio Access Network; Evolved Universal Terrestrial Radio Access Network (E-UTRAN); X2 application protocol (X2AP) (Release 17); 178 pages.
3GPP TS 38.413 V17.0.0 (Apr. 2022) Technical Specification 3rd Generation Partnership Project; Technical Specification Group Radio Access Network; NG-RAN; NG Application Protocol (NGAP) (Release 17); 561 pages.
3GPP TS 38.423 V0.10.02 (May 2017) Technical Specification; 3rd Generation Partnership Project; Technical Specification Group Radio Access Network; NG Radio Access Network (NG-RAN); XN application protocol (XnAP) (Release 15); 56 pages.
Huawei, "Revised SI: Study on network energy savings for NR," 3GPP TSG RAN Meeting #95e RP-220297, Electronic Meeting, Mar. 17-23, 2022, 5 pages.
TSG SA, "LS on Energy Efficiency as guiding principle for new solutions," 3GPP TSG-SA WG1 Meeting #97e S1-220063, Electronic Meeting, Feb. 14-24, 2022, 2 pages.
TSG SA, "LS on Energy Efficiency as guiding principle for new solutions," 3GPP TSG-WG SA Meeting #94 e-meeting SP-211621, Dec. 14-20, 2021, 2 pages.
SA1 (from S1-221232), "New SID: Study on Energy Efficiency as service criteria," 3GPP TSG Meeting #96e SP-220446, Electronic Meeting, Jun. 7-10, 2022, 4 pages.
Examination Report issued Jun. 30, 2025, in connection with United Kingdom Patent Application No. 2211156.1, 5 pages.
Office Action issued Nov. 10, 2025, in connection with Korean Patent Application No. 10-2023-7043660, 7 pages.
Examination Report issued Mar. 30, 2026, in connection with United Kingdom Patent Application No. GB2211156.1, 5 pages.

* cited by examiner

FIG. 1

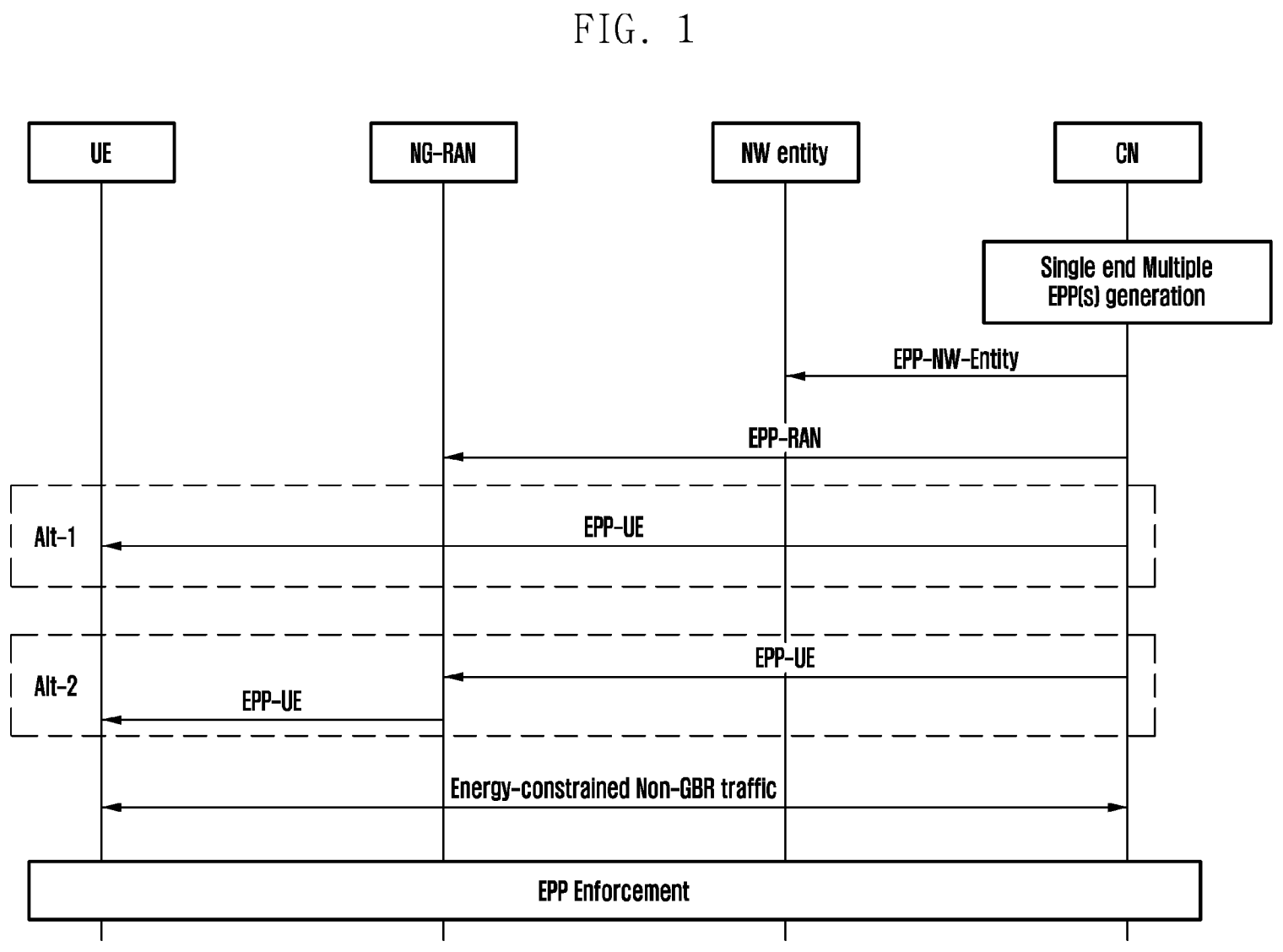

UE
NG-RAN
NW entity
CN
Single end Multiple EPP(s) generation
EPP-NW-Entity
EPP-RAN
EPP-UE
Alt-1
EPP-UE
EPP-UE
Alt-2
Energy-constrained Non-GBR traffic
EPP Enforcement

METHOD AND APPARATUS FOR ENERGY PERFORMANCE POLICY

CROSS-REFERENCE TO RELATED APPLICATION

This application is based on and claims priority under 35 U.S.C. § 119(a) of a United Kingdom patent application number 2211156.1, filed on Jul. 30, 2022, in the United Kingdom Intellectual Property Office, the disclosure of each of which is incorporated by reference herein in its entirety.

BACKGROUND

1. Field

The present invention relates to telecommunication networks such as New Radio (NR), for example 5G NR, and energy efficiency thereof.

2. Description of Related Art

There is a need to improve energy efficiency of telecommunication networks such as NR, for example 5GNR, for example by improving energy efficiency of the whole network (i.e., end-to-end), sub-networks (e.g., the radio access network), single network elements and/or telecommunication sites, which contain network elements and site equipment, for example by improving energy efficiency of base stations, gNBs and/or UEs thereof and/or communication therebetween.

SUMMARY

It is one aim of the present invention, amongst others, to provide a method and apparatus for improving energy efficiency of telecommunication networks which at least partially obviates or mitigates at least some of the disadvantages of the prior art, whether identified herein or elsewhere.

The technical subjects pursued in the disclosure may not be limited to the above mentioned technical subjects, and other technical subjects which are not mentioned may be clearly understood, through the following descriptions, by those skilled in the art to which the disclosure pertains.

The present disclosure provides an effective and efficient method for improving energy efficiency of network.

For instance, it is an aim of embodiments of the invention to provide a method and apparatus for improving energy efficiency of the whole network (i.e., end-to-end), sub-networks (e.g., the radio access network), single network elements and/or telecommunication sites, which contain network elements and site equipment. For instance, it is an aim of embodiments of the invention to provide a method and apparatus for improving energy efficiency of base stations, gNBs and/or UEs thereof and/or communication therebetween.

A first aspect provides a method of managing an energy performance policy, EPP, for a user equipment, UE, over a network interface of a network, for example a New Radio, NR, network such as a 5G NR network, the method comprising:

- sending, by the Core Network, CN, for example the Access and Mobility Management Function, AMF, thereof, assistance information on the EPP for the UE to an NG-RAN node and/or to the UE using signalling and/or messages; and
- managing the EPP for the UE.

A second aspect provides a network, for example a New Radio, NR, network such as a 5G NR network, configured to implement the method according to the first aspect.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 1 illustrates an example of network generating and distributing EPP(s) to network entities and/or UE;

DETAILED DESCRIPTION

Figure 2:
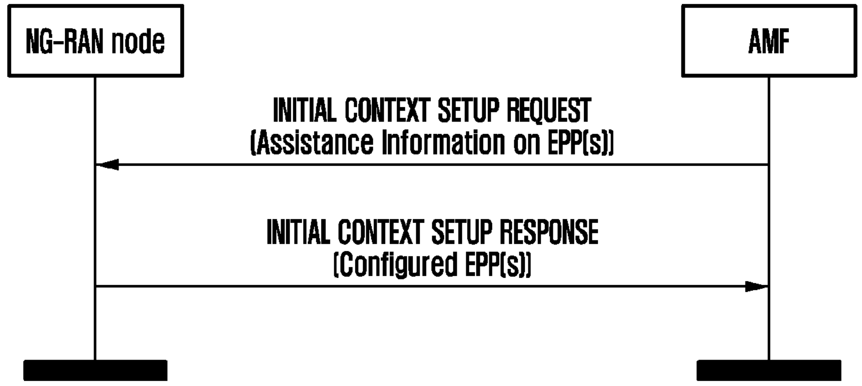
FIG. 2 illustrates an example of including "Assistance Information on EPP(s) IE" and "Configured EPP(s) IE" in INITIAL CONTEXT SETUP REQUEST and RESPONSE messages, respectively.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to the present invention there is provided a method, as set forth in the appended claims. Also provided is a network. Other features of the invention will be apparent from the dependent claims, and the description that follows.

The first aspect provides a method of managing an energy performance policy, EPP, for a user equipment, UE, over a network interface of a network, for example a New Radio, NR, network such as a 5G NR network, the method comprising:

sending, by the Core Network, CN, for example the Access and Mobility Management Function, AMF, thereof, assistance information on the EPP for the UE to an NG-RAN node and/or to the UE using signalling and/or messages; and managing the EPP for the UE.

In one example, sending, by the CN, for example the AMF thereof, the assistance information on the EPP for the UE to the NG-RAN node and/or to the UE using the signalling and/or the messages comprises sending, by the AMF, the assistance information on the EPP for the UE directly to the UE in a Non-Access Stratum, NAS, message and/or sending, by the AMF, the assistance information on the EPP for the UE to the NG-RAN node and forwarding, by the NG-RAN node, the assistance information on the EPP for the UE to the UE in a Radio Resource Control, RRC, message and/or pre-configuring the UE with the assistance information on the EPP for the UE.

In one example, sending, by the AMF, the assistance information on the EPP for the UE to the NG-RAN node comprises sending, by the AMF, the assistance information on the EPP for the UE to the NG-RAN node in an INITIAL CONTEXT SETUP REQUEST message and sending, by the NG-RAN node, a response to the AMF in an INITIAL CONTEXT SETUP RESPONSE message and/or sending, by the AMF, the assistance information on the EPP for the UE to the NG-RAN node in an CONTEXT MODIFICATION REQUEST message and sending, by the NG-RAN node, a response to the AMF in a CONTEXT MODIFICATION RESPONSE message.

In one example, the method comprises storing, by the NG-RAN node, the assistance information on the EPP for the UE and using, by the NG-RAN node, the assistance information on the EPP for the UE at the UE, for example by monitoring, calculating charge and/or cost and/or adjusting energy usage.

In one example, the method comprises providing, by the UE, information on current usage levels, for example per QoS flow, per session, and/or per slice granularity and/or predictions on future energy usage and/or expected time of usage and duration, to the network, for example to the NG-RAN node, the AMF, and/or the CN.

In one example, the method comprises informing, by the NG-RAN node, the EPP configured at the UE, to the network, for example to the NG-RAN node, the AMF, and/or the CN.

In one example, the method comprises modifying, by the NG-RAN node, the assistance information on the EPP and/or the EPP for the UE and optionally, sending, by the NG-RAN node, the modified assistance information on the EPP and/or the EPP for the UE to the network, for example to the NG-RAN node, the AMF, and/or the CN.

In one example, the method comprises managing, by the NG-RAN node, energy usage at the UE, using the assistance information on the EPP for the UE.

In one example, the method comprises modifying, by the NG-RAN node, the EPP for the UE, based on current or upcoming UE access conditions.

In one example, the method comprises configuring, by the NG-RAN node, an EPP for the UE, for example if the NG-RAN does not receive the assistance information on the EPP for the UE.

In one example, the method comprises enforcing, by the network for example the NG-RAN node, energy consumption of the UE, for example based on the assistance information on the EPP for the UE.

In one example, enforcing, by the network for example the NG-RAN node, energy consumption of the UE, for example based on the assistance information on the EPP for the UE, comprises limiting an energy utilization rate of the UE, for example for a given service thereof, for example if the energy utilization rate is greater than a MFER limit, included in the EPP for the UE, for example for QoS flow.

In one example, enforcing, by the network for example the NG-RAN node, energy consumption of the UE, for example based on the assistance information on the EPP for the UE, comprises storing, by the NG-RAN node, the PDU Session Aggregate Maximum Energy Rate for each PDU session and using, by the NG-RAN node, the stored PDU Session Aggregate Maximum Energy Rate when enforcing, by the network for example the NG-RAN node, energy consumption of the UE, for example for all energy-constrained Non-GBR QoS flows for the UE.

In one example, the method comprises supporting, by the network, a subscription policy that defines a maximum energy utilization rate for services without associated service guarantees including a guaranteed bit rate.

In one example, the method comprises supporting, by the network, a subscription policy that defines a maximum energy utilization rate for services without associated service guarantees including a guaranteed bit rate.

The second aspect provides a network, for example a New Radio, NR, network such as a 5G NR network, configured to implement the method according to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Introduction

SI RAN1 (Study on Network Energy Savings for NR)

In RAN #95, RAN agreed the SI "Study on network energy savings for NR" [1]:

3 Justification

[...]

The study should not only evaluate the potential network energy consumption gains, but also assess and balance the impact on network and user performance, e.g., by looking at KPIs such as spectral efficiency, capacity, user perceived throughput (UPT), latency, UE power consumption, complexity, handover performance, call drop rate, initial access performance, SLA assurance related KPIs, etc. The techniques to be studied should avoid having a large impact to such KPIs.

4 Objective

The objectives of the study are the following:

1. Definition of a base station energy consumption model [RAN1]

☐ [...]

2. Definition of an evaluation methodology and KPIs [RAN1]

☐ The evaluation methodology should target for evaluating system-level network energy consumption and energy savings gains, as well as assessing/balancing impact to network and user performance (e.g., spectral efficiency, capacity, UPT, latency, handover performance, call drop rate, initial access performance, SLA assurance related KPIs), energy efficiency, and UE power consumption, complexity. The evaluation methodology should not focus on a single KPI, and should reuse existing KPIs whenever applicable; where existing KPIs are found to be insufficient new KPIs may be developed as needed.

Note: WGs will decide KPIs to evaluate and how.

3. Study and identify techniques on the gNB and UE side to improve network energy savings in terms of both BS transmission and reception, which may include:

☐ How to achieve more efficient operation dynamically and/or semi-statically and finer granularity adaptation of transmissions and/or receptions in one or more of network energy saving techniques in time, frequency, spatial, and power domains, with potential support/feedback from UE, and potential UE assistance information [RAN1, RAN2]

☐ Information exchange/coordination over network interfaces [RAN3]

Note: Other techniques are not precluded

The study should prioritize idle/empty and low/medium load scenarios (the exact definition of such loads is left to the study), and different loads among carriers and neighbor cells are allowed.

-

Study on System and Functional Aspects of Energy Efficiency in 5G Networks

According to TR 32.972 [2]:

4 EE KPIs and metrics 4.1 Introduction

Telecommunication networks energy efficiency KPIs are defined by various SDOs / organizations and are of various natures. They can be applied to either:

whole networks (i.e., end-to-end), or to sub-networks (e.g., the radio access network), or to single network elements, or to telecommunication sites, which contain network elements and site equipment.

7 EE control framework 7.1 General EE control framework

The key functions in self-managed automated energy efficiency control processes should include:

EE Policy Management: defines and manages the energy efficiency control policies related to the energy consumption status and control operations at the network, equipment and site levels. It translates the policy information into configurations at the EE optimisation entities at network, equipment and site levels, where applicable. The policy may be adjusted according to achievable EE KPI and the variations of QoS/QoE.

EE Control and Coordination: the energy efficiency control is designed to be a self-managed and automated process to control and coordinate the power saving operations across all the relevant elements at a network, equipment and site levels.

The operating conditions such as traffic load and density at the network and equipment levels and operational conditions such as temperature and humidity at the site level are monitored and reported. According to the energy efficiency control policy and the current status, energy efficiency control operations are activated/deactivated in each of the EE optimisation -continued entities. The embedded energy metering function in each EE optimisation entity collects the necessary statistics such as EE KPI and QoS/QoE and then report the information to the EE Profiles Management. The energy efficiency optimisation entity can be a logical or physical component to execute the EE policies and the corresponding energy consumption optimisation operations.

EE Profiles Management: monitors, collects, processes, stores and provides EE related information and statistics including the profiles for traffic, operating conditions, the corresponding achievable EE KPI, the variations of QoS/QoE in reference to the pre-fined QoS/QoE requirements from the embedded energy metering functions in each of the EE optimisation entities. The information is assessed and then sent to the EE Control and Coordination for adjusting the power saving control operations and possible policy adjustment by the EE Policy Control.

Study on Energy Efficiency as Service Criteria

This is a study item in SA1 that has a breadth of scope to cover new uses of energy efficiency from a service perspective—including the use of energy performance and energy performance policy [8].

This study is aiming at identifying use cases, providing gap analysis and defining potential requirements in the following aspects regarding enhancement on energy efficiency of 5G network.
The objectives include:
Define and support energy efficiency criteria as part of communication service to user and application services.
Support information exposure on systematic energy consumption or level of energy efficiency to vertical customers.
Gap analysis between the identified potential requirements and existing 5GS requirements or functionalities.
Other aspects include security, charging and privacy.

Problem Statement

- Trading off energy saving/efficiency for performance is not acceptable.
- Telecommunication networks energy efficiency KPIs are applied to whole networks (i.e., end-to-end), or to sub-networks (e.g., the radio access network), or to single network elements, or to telecommunication sites. That is,
- Existing Energy metrics refer to the network as a whole rather than energy usage at the UE-level.
- Energy monitoring capabilities are not tied into specific user sessions (currently this is for the network). That is, no means exist to specifically monitor or estimate (model, etc.) the expenditure on a finer granularity than the network itself. These granularities could include a specific slice, a specific UE, specific PDU session, or even a specific QoS Flow. This information is of importance to specific service providers, as shown by the objective, section 3.2.3 (above), "Support information exposure on systematic energy consumption or level of energy efficiency to vertical customers."
- Approximately 95% of telecommunication traffic is "best effort" with non-GBR (QoS flows). Nonetheless, in current networks, such traffic may still have similar energy consumption levels and/or assigned similar energy efficiency KPIs as those applied to GBR traffic.
- In current telecommunication networks, network operators and service providers have no tools to control energy consumption based on traffic type. That is, there is no energy enforcement policy according to traffic type.

Questions

In the following, the inventors define solutions to introduce a new traffic type and a related energy enforcement policy that allow control of energy consumption according to traffic type. More specifically, the inventors address the following questions:

1. How the network defines Energy Performance Policy (EPP)?
2. How to introduce a new class of traffic with energy consumption control?
3. How the network exchange assistance information related to EPP between network entities (e.g., CN, RAN, other internal or external entities and/or network functions)?
4. How the network uses EPP for energy enforcement?
5. How and what assistance information the UE and/or a network entity may provide to the network in relation to EPP?
6. How the network provides to information on assigned EPP(s)?

Solutions

1. Energy Constrained Non-GBR Traffic Class

In this section the inventors introduce a new type/class of non-GBR traffic, termed "Energy constrained non-GBR", for delay tolerant services. The network may use the Energy Performance Policy (EPP), defined in section 3.6.2, to manage energy consumption enforcement due to this type of traffic in the network (e.g., at the UE, RAN, CN, and/or any other internal or external entities and/or network functions).

Table 1 shows an example of including the new traffic type "Energy constrained Non-GBR" as update to 3GPP specification on Standardized 5QI (Table 5.7.4-1, section 5.7.4, TS 23.501 [6]):

TABLE 1

Standardized 5QI to QoS characteristics mapping

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR | 20 | 100 ms (NOTE 11, NOTE 13) | $10^{-2}$ | N/A | 2000 ms | Conversational Voice |

[ . . . ]

TABLE 1-continued

Standardized 5QI to QoS characteristics mapping

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 5 | Non-GBR | 10 | 100 ms NOTE 10, NOTE 13) | $10^{-6}$ | N/A | N/A | IMS Signalling |
| [ . . . ] | | | | | | | |
| 82 | Delay-critical GBR | 19 | 10 ms (NOTE 4) | $10^{-4}$ | 255 bytes | 2000 ms | Discrete Automation (see TS 22.261 [2]) |
| [ . . . ] | | | | | | | |
| 91 | Energy constrained Non-GBR | 90 | 1100 ms | $10^{-2}$ | N/A | N/A | Delay tolerant services (NOTE 18). |

[unchanged text omitted]

NOTE 18:

These services are expected to be constrained in terms of their energy consumption. E.g., based on a defined Energy Consumption Policy (EPP). When energy conditions apply, the enforcement may take specific forms, e.g., blocking traffic, adding latency, tolerating errors,etc. Moreover, the specifics of the enforcement may require further information, e.g., the limits of delay tolerance.

QoS Parameters Applicable to New Traffic Class

In the following the inventors introduce new parameters applicable to the energy-constrained non-GBR traffic class:

Maximum Flow Energy Rate

For Energy Constrained Non-GBR QoS Flows, the following additional QoS parameter exists:

Maximum Flow Energy Rate (MFER)—UL and DL

The MFER limits the energy rate corresponding to service to provide the QoS Flow (e.g., excess traffic may get discarded or delayed by a rate shaping or policing function at the UE, RAN, UPF). Energy consumption rates below the MFER value are provided with relative priority determined by the Priority Level of the QoS Flows (see clause 5.7.3.3).

The MFER is signalled to the (R)AN in the QoS Profile for each individual QoS Flow.

NOTE 1: The MFER is recommended to be no lower than the lowest acceptable energy utilization rate where the service will survive.

Aggregate Energy Rate

Each PDU Session of a UE is associated with the following aggregate rate limit QoS parameter:

per Session Aggregate Maximum Energy Rate (Session-AMER)

The Session-AMER is signalled to the appropriate UPF entity/ies to the UE and to the (R)AN (to enable the calculation of the UE-AMER). The Session-AMER limits the aggregate energy utilization rate that can be expected to be provided across all Non-GBR QoS Flows for a specific PDU Session. The Session-AMER is measured over an AMER averaging window which is a standardized value. The Session-AMER is not applicable to GBR QoS Flows.

Each UE is associated with the following aggregate rate limit QoS parameter:

per UE Aggregate Maximum Energy Rate (UE-AMER)

The UE-AMER limits the aggregate energy utilization rate that can be expected to be provided across all Energy Constrained Non-GBR QoS Flows of a UE. Each (R)AN shall set its UE-AMER to the sum of the Session-AMER of all PDU Sessions with active user plane to this (R)AN up to the value of the UE-AMER received from AMF. The UE-AMER is a parameter provided to the (R)AN by the AMF based on the value of the subscribed UE-AMER retrieved from UDM or the dynamic serving network UE-AMER retrieved from PCF (e.g., for roaming subscriber). The AMF provides the UE-AMER provided by PCF to (R)AN if available. The UE-AMER is measured over an AMER averaging window which is a standardized value. The UE-AMER is not applicable to GBR QoS Flows.

Each group of PDU Sessions of the UE for the same slice (S-NSSAI) may be associated with the following aggregate energy utilization rate limit QoS parameter:

per UE per Slice-Maximum Energy Rate (UE-Slice-MER)

The UE-Slice-MER limits the aggregate energy utilization rate that can be expected to be provided across all Energy Constrained Non-GBR QoS Flows corresponding to PDU Sessions of the UE for the same slice (S-NSSAI) which have an active user plane. Each supporting RAN shall set its UE-Slice-MER to the sum of the Session-AMER and MFER for all Energy Constrained Non-GBR QoS Flows of all PDU Sessions corresponding to the slice (S-NSSAI) with active user plane to this RAN up to the value of the UE-Slice-MER corresponding to the slice (S-NSSAI) received from AMF. The UE-Slice-MER is measured over an AMER averaging window which is a standardized value. The UE-Slice-MER is an optional parameter provided to the RAN by the AMF.

NOTE: The AMER averaging window may be applied to Session-AMER, UE-AMER and UE-Slice-MER measurement and the AMER averaging windows for Session-AMER and UE-AMER are standardised to the same value.

Resource Type

An Energy Constrained Non-GBR QoS Flow may be preauthorized through static policy and charging control, however the energy constraint is typically authorized “on demand” which may use dynamic policy and charging control.

2. Energy Performance Policy (EPP)

In this section the inventors introduce a new facility for Energy Performance Policy (EPP) that can be used for managing energy consumption, such as charging, monitoring, and enforcement, in the network (e.g., at the UE, RAN, CN, and/or any other internal or external entities and/or network functions).

- This policy can be considered a new KPI 'type', that can be used/evaluated as a single KPI or together with existing KPIs (e.g., QoS/QoE, throughput, latency, jitter, packet error rate, and/or other metrics).
- The energy performance policies are stored and/or signaled using existing signaling/messages and/or new signaling/messages.
- The network may provide a single or multiple energy consumption policies at the granularity of:
- The whole network (i.e., EPP-Network). That is, energy enforcement on traffic going through the whole network (all entities and functions handling the traffic).
- Per network entity and/or network function (i.e., energy enforcement on a given entity or NF),
- E.g., EPP-RAN, EPP-CN entity, EPP-NF, EPP-NW-Entity (e.g., EPP-AMF, -SMF, -NSSF, -PCF, -UDM, -UPF, and/or any other internal or external entity), and/or
- Per UE:
- EPP per QoS flow, EPP per PDU session, EPP per network slice, EPP per service.
- And/or any mix of EPP granularities (above), e.g.:
- EPP-{UE, RAN} and EPP-{RAN, AMF}, EPP-{UE, RAN, AMF}, EPP-{RAN, AMF, SMF}.

FIG. 1 illustrates an example of a network generating and distributing EPP(s) to different network entities and/or UE. The EPP(s) are used to enforce the energy consumption related to services using energy-constrained non-GBR traffic in the different network entities and/or UE. The network may provide EPP-UE directly (Alt-1) or via NG-RAN (Alt-2).

Answers to Questions

Network Defined Energy Performance Policy (EPP)

In the following the inventors define solutions to address the following question defined above:

1. How the network defines Energy Performance Policy (EPP)?

The following are proposed as different ways for the network to create/define EPPs for a given UE. It should be noted that some or all proposals may also apply for creating/defining EPPs for a network entity and/or network functions. Additionally, the proposals apply in any order and/or combination.

The network may obtain/generate/provide/create EPP(s) for the designated UE based on the following:

- Subscriber information (e.g., retrieved from UDM). E.g., the subscriber information may include the following parameters related to setting up the EPP for the designated UE:
- Energy utilization level (total, maximum, minimum, average) at any time, per QoS flow, network slice, session, other.
- Energy usage charge/cost (per QoS flow/network slice/session, service) other
- E.g., based on this parameter, the network (e.g., gNB) may decide that the energy cost related to serving the UE, at its current location, e.g., at the cell-edge, could be too costly and higher than the allowed cost of energy usage for the UE.
- Hence, the network may terminate/release the UE and indicate the reason/cause as, e.g., "not supported energy cost" or any other naming.
- The network may consider the energy cost of communication for the slice, UE, QoS flow, etc. in determining the resources to assign to the UE, so that it will receive proportionately less resources—perhaps none at all if the policy allows this—when it is at the cell edge, etc. where communication is more 'energy expensive'. This may result in significant performance reduction in scenarios in which coverage is poor.
- Energy usage range for "best effort services"
- E.g., the network and/or UE may use a reduced energy level, chosen from energy usage range, for "best effort" traffic.
- Assistance information from the network (e.g., NW entities and/or NW functions), for example:
- Assistance information based on NWDAF analytics/predictions (UE energy usage patterns, and/or energy cost patterns, etc.). The network (e.g., AMF and/or NG-RAN) may subscribe directly (or via another entity) for NWDAF analytics.
- E.g., in case of NWDAF analytics showing high patterns of energy consumption for a given UE (or groups of UEs), the network may decide to modify the EPP parameters (e.g., Energy usage Charge, Energy utilization level, other) in order to reduce energy consumption in the network and/or energy usage cost (to the UE).
- Energy analytics could be used by a service provider or end customer to decide to redeploy their devices for greater energy efficiency, e.g., move their devices to better coverage, change the configuration at the application layer to communicate less frequently, etc.
- A service provider with a large number of devices can consider the overall capacity development for the aggregate (at the slice level or a sum of individual components) to identify the trend for energy consumption over time. This may influence their capacity planning. If the energy analytics are linked to location information, the entire deployment architecture of the massive # of devices could be adjusted for greater energy efficiency.
- Assistance information based on interaction with other network functions and/or entities (internal and/or external). For example,
- The network may decide EPP(s) values based on interaction with PCF (i.e., existing policy and charging rules) and/or SMF (existing rules for setting up sessions).
- Alternatively, the network (e.g., NG-RAN, AMF, other) may directly obtain assistance information on EPPs for a designated UE, from another network central node or a newly defined Network entity or Network Function that can be dedicated to store, manage, and share EPPs to NG-RAN (or other NW entities and NFs) directly or via another NW entity.
- Alternatively, EPP(s) may be decided by the network operator, service provider, and/or or end customer, e.g., based on a service contract.

Exchange of EPP Information Over Network Interfaces

In the following the inventors define solutions to address the following question defined above:

2. How the network exchange assistance information related to EPP between network entities (e.g., CN, RAN, other internal or external entities and/or network functions)?

The following are proposed as different ways for the network to exchange assistance information on EPPs for a given UE over network interfaces. It should be noted that some or all proposals may also apply for exchanging information on EPPs among network entities and/or network functions. Moreover, it should be noted the that proposals apply in any order and/or combination.

In an embodiment, the CN (e.g., AMF) may send the assistance information on EPP(s) assigned for the designated UE to the NG-RAN and/or UE using existing and/or newly defined signalling and messages.

For example, the AMF can send the assistance information on assigned EPP(s) directly to the UE in a NAS Message (e.g., Registration Accept or Configuration Update Command message), and/or send it to NG-RAN, which forwards this information to the UE in RRC message (e.g., RRC Reconfiguration message and/or any newly defined RRC message).

For example, the AMF may send the following information (in existing or newly defined IE(s)) to NG-RAN and/or UE (and/or other network entities):

Assistance Information on EPP(s) IE={list of EPPs (e.g., EPP ID, EPP Type (EPP-UE, EPP-RAN, EPP-CN, EPP-NF, Other), UE ID, RAN ID, NW-entity ID, other), EPP Granularity (e.g., EPP per QoS flow, EPP per PDU session, EPP per NSSAI, other), Energy Charge Granularity (e.g., per QoS flow, PDU session, NSSAI, other), Energy Charge Variability (e.g., same for all services/use cases, dependent on service/use case, fixed over a given time/location, variable/dynamic depending on energy utilization rate, other), traffic type (GBR, delay-critical GBR, energy-constrained non-GBR, non-GBR (i.e., non energy constrained non-GBR), AMER-UL and AMER-DL, MFER-UL and MFER-DL, Session-AMER, UE-AMER, UE-Slice-MER, EPP(s) validity time and/or location, other information related to energy usage management for the designated UE and/or NW entity and/or NF}.

Alternatively, the network may signal some or all QoS related parameters, e.g., MFER-UL and -DL to the NG-RAN (and/or UE) included in the QoS Profile for each individual QoS Flow.

In another example, the AMF and NG-RAN may exchange the "Assistance Information on EPP(s) IE" and/or information related to this IE, as part of the UE Radio Capability Information [38.413].

Figure 3:
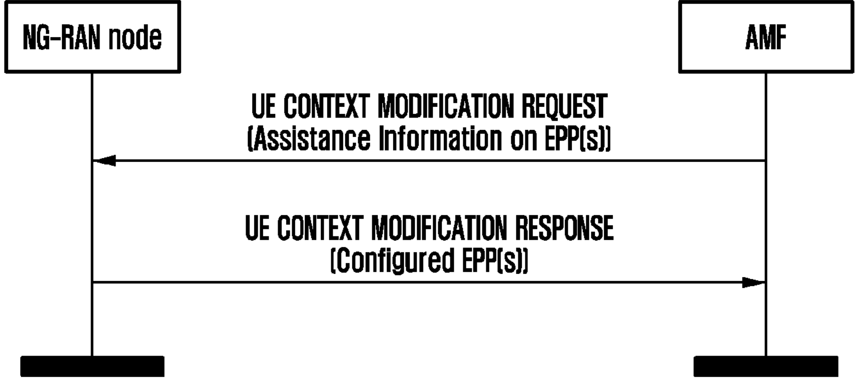
FIG. 3 illustrates an example of including "Assistance Information on EPP(s) IE" and "Configured EPP(s) IE" in UE CONTEXT MODIFICATION REQUEST and RESPONSE messages, respectively.
Figure 4:
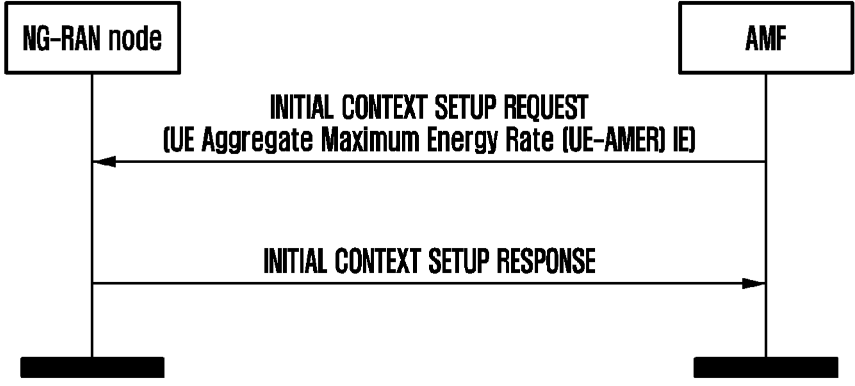
FIG. 4 illustrates an example of including UE-AMER IE in INITIAL CONTEXT SETUP REQUEST message.
Figure 5:
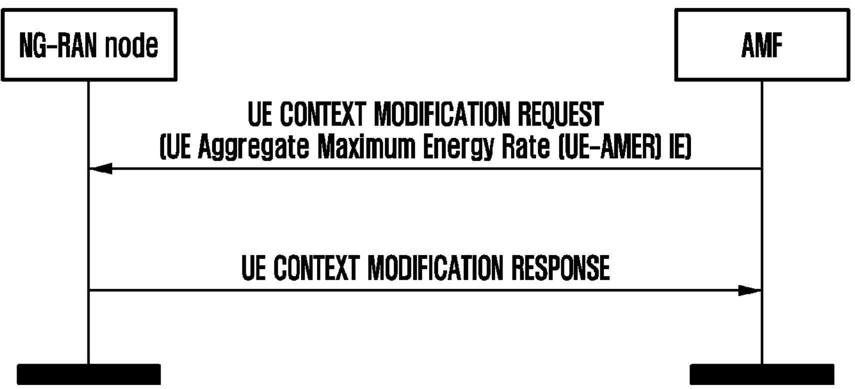
FIG. 5 illustrates an example of including UE-AMER IE in UE CONTEXT MODIFICATION REQUEST message.

FIGS. 2 and 3 and Tables 2 and 3 illustrate examples of specification update to exchange the following newly defined IEs over NG interface [38.413]:

AMF sends the "Assistance Information EPP(s) IE" to NG-RAN in INITIAL CONTEXT SETUP REQUEST message and CONTEXT MODIFICATION REQUEST message.

NG-RAN sends the "Configured EPP(s) IE" to AMF in INITIAL CONTEXT SETUP RESPONSE message and CONTEXT MODIFICATION RESPONSE message.

TABLE 2

Example of including "Assistance Information on EPP(s) IE" in INITIAL CONTEXT SETUP REQUEST message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| [ . . . ] | | | | | | |
| Assistance Information on EPP(s) | O | | 9.x.x.x.x | Indicates the EPP(s) defined/set by the network for the designated UE. | YES | ignore |

TABLE 3

Example of including "Assistance Information on EPP(s) IE" in INITIAL CONTEXT SETUP REQUEST message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | | YES | ignore |
| [ . . . ] | | | | | | |
| Configured EPP(s) | O | | 9.x.x.x.x | Indicates the EPP(s) configured by the RAN for the designated UE. | YES | ignore |

Energy Consumption Management Using Assistance Information on EPP(s)

In the following the inventors define solutions to address the following question defined above:

3. How the network may use EPP to manage the energy at the UE ?
4. How and what assistance information the UE may provide to the network in relation to EPP?

The following are proposed as different ways for the network to manage energy consumption at the UE based on information included in EPP(s) assigned (by the network) for a given UE. It should be noted the that proposals apply in any order and/or combination.

The NG-RAN stores (or shall store, if supported) the received EPP(s) values in the UE context, and use the EPP(s) for energy usage management at the UE (e.g., monitoring, charge and cost calculations, energy usage adjustment in case of "best effort traffic", other actions).

[Optionally] the UE may provide the network (NG-RAN, AMF, other 5CN entity, or external entity) information on the current energy usage levels (e.g., per QoS flow, session, and/or slice granularity), and if available predictions on future energy usage and expected time of usage and duration.

For example, the UE feedback/information can be shared with the NG-RAN (or other network entities via NG-RAN) using existing RRC signaling/messages (RRCReconfigurationComplete, RRCSetupComplete, RRCReestablishementComplete, RRCResumeComplete, ULInformationTransfer, UECapabilityInformation, UEAssistanceInformation, MeasurementReport, and/or other RRC signaling/messages [38.331]), and/or newly defined RRC signaling/messages.

[Optionally] the UE may include the list of requested energy usage levels (e.g., per QoS, per PDU session, etc.), e.g., in the NAS Registration Request message sent to 5GC.

The NG-RAN may inform the network (e.g., AMF or other entities) of EPP(s) configured at the UE. For example, NG-RAN node may include this information in an existing IE or a newly defined IE "Configured EPP(s) IE", as shown in FIGS. 1 and 2 and Table 2.

The NG-RAN may modify the received information on EPP(s) for a given UE, considering UE current or upcoming connection/access conditions (e.g., UE at cell edge, delay-tolerant traffic, battery-level at UE, etc.). The updated EPP (s) information may be sent to the network (e.g., AMF or other entities) as part of the "Configured EPP(s) IE".

The NG-RAN may behave as follows:

Alt-1:

If NG-RAN receives the "Assistance Information on EPP(s)" from the network (e.g., AMF, or any other network entity and/or functions), for example, included in any of UE context management messages, the NG-RAN may use this information to manage energy usage at the designated UE.

Alt-2:

If NG-RAN receives the "Assistance Information on EPP(s)" from the network (e.g., AMF, or any other network entity and/or functions), the NG-RAN may modify the NW assigned EPP(s) based on current or upcoming UE access conditions. The NG-RAN indicates the modified EPP(s) to the network.

Alt-3:

If NG-RAN did not receive "Assistance Information on EPP(s)" from the network or feedback from UE, the NG-RAN may configure EPP(s) suitable for the UE (based on UE access conditions).

The network (e.g., NG-RAN) may enforce energy consumption at the UE, based on the content (i.e., parameters, IEs) included in the received assistance information on EPP-UE (e.g., MFER IE, Session-AMER IE, UE-AMER IE, and/or other IEs) as follows:

For example, the network may limit the energy utilization rate, corresponding to all Energy Constrained non-GBR QoS flows, for a given service at the UE, if the energy utilization rate is larger than the MFER limit, included in the EPP-UE, for QoS flow(s), E.g., the network may discard and/or delay excess traffic, destined to the UE, using rate shaping or policing function at the UE, RAN (or other NW entities, e.g., UPF).

In another example, for each PDU session for which the PDU Session Aggregate Maximum Energy Rate (Session-AMER) IE, is included in the Assistance Information on EPP, i.e., sent by AMF to the NG-RAN, the NG-RAN shall store the received value in the UE context and use it when enforcing energy consumption policing for all energy-constrained Non-GBR QoS flows for the concerned UE.

For example, the AMF may include the PDU Session Aggregate Maximum Energy Rate (Session-AMER) IE in PDU Session Resource Setup Request Transfer IE of the PDU SESSION RESOURCE SETUP REQUEST message. In another example, for each PDU session for which the PDU Session Aggregate Maximum Energy Rate (Session-AMER) IE is included in the PDU Session Resource Setup Request Transfer IE of the PDU SESSION RESOURCE SETUP REQUEST message, the NG-RAN node shall store the received value in the UE context and use it when enforcing energy consumption policing for all energy-constrained Non-GBR QoS flows for the concerned UE as specified in TS 23.501.

In another example, the UE Aggregate Maximum Energy Rate (UE-AMER) IE should be sent to the NG-RAN node if the AMF has not sent it previously. If it is included in the PDU SESSION RESOURCE SETUP REQUEST message, the NG-RAN node shall store the UE Aggregate Maximum Energy Rate in the UE context, and use the received UE Aggregate Maximum Energy Rate for all energy-constrained Non-GBR QoS flows for the concerned UE as specified in TS 23.501.

If the PDU Session Aggregate Maximum Energy Rate (Session-AMER) IE is included in the PDU Session Resource Modify Request Transfer IE, the NG-RAN node shall store and use the received PDU Session Aggregate Maximum Energy Rate value when enforcing energy consumption policing for all energy-constrained Non-GBR QoS flows for the concerned UE as specified in TS 23.501.

The Session-AMER and MFER could also take into account the energy utilization of the CN. In this case these parameters could be enforced by the UPF.

The Session-AMER is signalled to the appropriate UPF entity/ies to the UE and to the (R)AN (to enable the calculation of the UE-AMER). The Session-AMER limits the aggregate energy utilization rate that can be expected to be provided across all Non-GBR QoS Flows for a specific PDU Session. The Session-AMER is measured over an AMER averaging window which is a standardized value.

Alternatively, the network could collect energy utilization information in other network entities and/or functions and enforce Session-AMER in other network entities (e.g., SMF, UPF, other). This may use, for example, a kind of 'averaging' of energy utilization for N PDU sessions, with 1/Nth being considered to be the energy used by any single PDU session, etc.

Transfer of EPP(s) Information to the UE

In the following the inventors define solutions to address the following question defined above:

5. How the Network Provides to the UE Information on Assigned EPP(s)?

The following are proposed as different ways for the network to transfer information on EPP(s) (assigned by the NW) to the designated EPP(s) to the designated UE. It should be noted the that proposals apply in any order and/or combination.

Alt-1: CN Provides Information EPP(s) to UE:

The network may directly provide assistance information on network assigned EPP(s) to the designated UE (e.g., via NAS signalling/messages).

Alt-2: NG-RAN Providing Information EPP(s) to UE:

NG-RAN may provide the UE with information on NW assigned EPP(s) (e.g., provided by CN, configured by NG-RAN, or dedicated network entity and/or any other network entity or function), in a given serving cell and/or neighbouring cells (at area-granularity level of TA, RA, PLMN, country, other area/location) at a given time, using:

RRC signalling, e.g.,

RRC Reconfiguration (UE in RRC_CONNECTED state)

RRC Release (on moving the UE to RRC_INACTIVE state).

System information broadcasted

Periodically or

On-demand (e.g., using MSG1/MSG3).

Alt-3: OAM Providing Information on EPP(s) to UE:

Information on NW assigned EPP(s) may be pre-configured in the UE (and/or NG-RAN, CN, another network entity, external entity) via OAM.

6.F Energy Utilization as a Performance Criteria for Best Effort Communication

6.F.1 Description

Currently energy utilization and efficiency can be monitored and considered through OAM and network operation, but not as a service performance criterion, as for example bit rate, latency or availability. The guidance from SA to all working groups in [m] states "The EE-specific efforts so far undertaken e.g., in SA5 have aimed mostly at improving the energy efficiency by impacting the operations of the system. As the inventors now are starting to specify the 5G-Advanced features, TSG SA kindly requests the recipient WGs and TSGs to consider EE even more as a guiding principle when developing new solutions and evolving the 3GPP systems specification, in addition to the other established principles of 3GPP system design. TSG SA clarifies that in addition to EE, other system level criteria shall continue to be met (i.e., the energy efficiency aspects of a solution defined in 3GPP is not to be interpreted to take priority or to be alternative to security, privacy, complexity etc. and to meeting the requirements and performance targets of the specific feature(s) the solution addresses)."

There is an important type of traffic where energy efficiency policy, for example a maximum amount of energy to be utilized could be applied without conflict with this guidance. Best effort traffic is a type of traffic that is provided as a service to customers everything else being equal. Of course security, privacy and complexity principles will not be sacrificed, but there is no conflict between a service policy that constrains performance (e.g., latency, throughput, even availability) on the basis of energy utilization and a best effort service, since there are no guarantees in the case of best effort traffic.

In the following use case, the possibility of using energy utilization as a new service criterion for this less constrained type of mobile telecommunication service is explored.

A large scale logistics company L has deployed a large number of communicating components. These are integrated into vehicles, palettes, facilities, etc., essentially IoT terminals enable remote tracking and monitoring functions. The information gathered is relevant but not constrained with respect to low latency. In fact, eventual delivery (e.g., after hours or even a full day) of communication is entirely acceptable for L. The MNO M offers a 'green service' which limits the rate of energy utilized for communication over a particular time interval (e.g., per day) and this service is to L, whose overall corporate goals are also served, as they strive to operate with energy efficiency.

6.F.2 Pre-Conditions

L deploys many UEs with associated subscriptions from M. These subscriptions policies include the following criteria:

Best Effort Service

Energy Constraints applied to service delivery

6.F.3 Service Flows

1. The fleet of trucks belonging to L leave the logistic center located in the middle of the uninhabited region 100s of kilometers northeast of the major city Erehwon. There are many devices located in this fleet. The trucks and their contents comprise a physically dense group of UEs, all communicating periodically with the network. This 'massive IoT' group leaves the coverage of the logistics center. The network coverage over the road through the uninhabited region has very sparse coverage.
2. As the trucks proceed into extreme low coverage, the energy utilized to communicate with the IoT devices increases. This is information is monitored by the 5G System and can be aggregated, e.g., at the slice level.
3. The associated policy for the service provided to L includes a maximum energy utilization rate. At a certain point the IoT communication of the fleet exceeds this maximum energy utilization rate.
4. The policy indicates that latency can be traded off with energy utilization for service to L; the communication service is delay tolerant in this condition. As the energy utilization rate has exceeded the maximum, the latency is increased to enforce this policy. In effect, L's fleet receives very limited service, with high latency, even for a limited period of time, no service at all.

6.F.4 Post-Conditions

The IoT devices in the fleet belonging to L is able to communicate with varying latency, depending on the energy utilization required to serve the devices. When the UEs are in poor coverage, they communicate seldom, when under good coverage, they can communicate more frequently.

The total energy utilization of the M's network has reduced while still providing adequate service to the customer L.

6.F.5 Existing Feature Partly or Fully Covering Use Case Functionality

The 5G System can monitor energy utilization.

The 5G System can enforce performance criteria.

6.F.6 Potential New Requirements Needed to Support the Use Case

[PR 6.F.6-1] Subject to operatory policy, the 5G system shall support subscription policies that define a maximum energy utilization rate for services without associated service guarantees including a guaranteed bit rate.

[PR 6.F.6-2] Subject to operator policy, the 5G system shall support enforcement of subscription policies that define a maximum energy utilization rate for services without associated service guarantees including a guaranteed bit rate.

Examples of Changes to 3GPP Specifications

TS 23.501

5.7.1.2 QoS Profile

A QoS Flow may either be 'GBR' or 'Non-GBR' depending on its QoS profile. The QoS profile of a QoS Flow is sent to the (R)AN and it contains QoS parameters as described below (details of QoS parameters are described in clause 5.7.2):

For each QoS Flow, the QoS profile shall include the QoS parameters:

5G QoS Identifier (5QI); and

Allocation and Retention Priority (ARP).

For each Non-GBR QoS Flow, the QoS profile may also include the QoS parameters:

Reflective QoS Attribute (RQA);

Maximum Energy Rate (MER).

For each GBR QoS Flow, the QoS profile shall also include the QoS parameters:

Guaranteed Flow Bit Rate (GFBR)—UL and DL; and

Maximum Flow Bit Rate (MFBR)—UL and DL; and

In the case of a GBR QoS Flow, the QoS profile may also include one or more of the QoS parameters:

Notification control;

Maximum Packet Loss Rate—UL and DL.

5.7.1.8a AMER/MFER Enforcement and Rate Limitation

The Aggregate Maximum Energy Rate and Maximum Flow Energy Rate are enforced by the RAN. The Maximum Flow Energy Rate is also enforced by the RAN.

5.7.2.10 Maximum Flow Energy Rate

For Energy Constrained Non-GBR QoS Flows, the following additional QoS parameter exists:

Maximum Flow Energy Rate (MFER)—UL and DL.

The MFER limits the energy rate corresponding to service to provide the QoS Flow (e.g., excess traffic may get discarded or delayed by a rate shaping or policing function at the UE, RAN, UPF). Energy consumption rates below the MFER value are provided with relative priority determined by the Priority Level of the QoS Flows (see clause 5.7.3.3).

The MFER is signalled to the (R)AN in the QoS Profile for each individual QoS Flow.

NOTE 1: The MFER is recommended to be no lower than the lowest acceptable energy utilization rate where the service will survive.

5.7.2.12 Aggregate Energy Rate

Each PDU Session of a UE is associated with the following aggregate rate limit QoS parameter:

per Session Aggregate Maximum Energy Rate (Session-AMER).

The Session-AMER is signalled to the appropriate UPF entity/ies to the UE and to the (R)AN (to enable the calculation of the UE-AMER). The Session-AMER limits the aggregate energy utilization rate that can be expected to be provided across all Non-GBR QoS Flows for a specific PDU Session. The Session-AMER is measured over an AMER averaging window which is a standardized value. The Session-AMER is not applicable to GBR QoS Flows.

Each UE is associated with the following aggregate rate limit QoS parameter:

per UE Aggregate Maximum Energy Rate (UE-AMER).

The UE-AMER limits the aggregate energy utilization rate that can be expected to be provided across all Energy Constrained Non-GBR QoS Flows of a UE. Each (R)AN shall set its UE-AMER to the sum of the Session-AMER of all PDU Sessions with active user plane to this (R)AN up to the value of the UE-AMER received from AMF. The UE-AMER is a parameter provided to the (R)AN by the AMF based on the value of the subscribed UE-AMER retrieved from UDM or the dynamic serving network UE-AMER retrieved from PCF (e.g., for roaming subscriber). The AMF provides the UE-AMER provided by PCF to (R)AN if available. The UE-AMER is measured over an AMER averaging window which is a standardized value. The UE-AMER is not applicable to GBR QoS Flows.

Each group of PDU Sessions of the UE for the same slice (S-NSSAI) may be associated with the following aggregate energy utilization rate limit QoS parameter:

per UE per Slice-Maximum Energy Rate (UE-Slice-MER).

The UE-Slice-MER limits the aggregate energy utilization rate that can be expected to be provided across all Energy Constrained Non-GBR QoS Flows corresponding to PDU Sessions of the UE for the same slice (S-NSSAI) which have an active user plane. Each supporting RAN shall set its UE-Slice-MER to the sum of the Session-AMER and MFER for all Energy Constrained Non-GBR QoS Flows of all PDU Sessions corresponding to the slice (S-NSSAI) with active user plane to this RAN up to the value of the UE-Slice-MER corresponding to the slice (S-NSSAI) received from AMF. The UE-Slice-MER is measured over an AMER averaging window which is a standardized value. The UE-Slice-MER is an optional parameter provided to the RAN by the AMF.

NOTE: The AMER averaging window may be applied to Session-AMER, UE-AMER and UE-Slice-MER measurement and the AMER averaging windows for Session-AMER and UE-AMER are standardised to the same value.

5.7.3 5G QoS Characteristics 5.7.3.1 General

This clause specifies the 5G QoS characteristics associated with 5QI. The characteristics describe the packet forwarding treatment that a QoS Flow receives edge-to-edge between the UE and the UPF in terms of the following performance characteristics:

1 Resource type (Non-GBR, Energy Constrained Non-GBR, GBR, Delay-critical GBR);

2 Priority Level;

3 Packet Delay Budget (including Core Network Packet Delay Budget);

4 Packet Error Rate;

5 Averaging window (for GBR and Delay-critical GBR resource type);

6 Maximum Data Burst Volume (for Delay-critical GBR resource type).

[ . . . ]

5.7.3.2 Resource Type

[ . . . ]

An Energy Constrained Non-GBR QoS Flow may be preauthorized through static policy and charging control, however the energy constraint is typically authorized "on demand" which may use dynamic policy and charging control.

TS 38.413:

8.2 PDU Session Management Procedures 8.2.1 PDU Session Resource Setup

For each PDU session for which the PDU Session Aggregate Maximum Energy Rate (Session-AMER) IE is included in the PDU Session Resource Setup Request Transfer IE of the PDU SESSION RESOURCE SETUP REQUEST message, the NG-RAN node shall store the received value in the UE context and use it when enforcing energy consumption policing for all energy-constrained Non-GBR QoS flows for the concerned UE as specified in TS 23.501 [9].

The UE Aggregate Maximum Energy Rate (UE-AMER) IE should be sent to the NG-RAN node if the AMF has not sent it previously. If it is included in the PDU SESSION RESOURCE SETUP REQUEST message, the NG-RAN node shall store the UE Aggregate Maximum Energy Rate in the UE context, and use the received UE Aggregate Maximum Energy Rate for all energy-constrained Non-GBR QoS flows for the concerned UE as specified in TS 23.501 [9].

If the PDU Session Aggregate Maximum Energy Rate (Session-AMER) IE is included in the PDU Session Resource Modify Request Transfer IE, the NG-RAN node shall store and use the received PDU Session Aggregate Maximum Energy Rate value when enforcing energy consumption policing for all energy-constrained Non-GBR QoS flows for the concerned UE as specified in TS 23.501 [9].

8.3 UE Context Management Procedures 8.3.1 Initial Context Setup

Figure illustrates an example of including UE-AMER IE in INITIAL CONTEXT SETUP REQUEST message.

Upon receipt of the INITIAL CONTEXT SETUP REQUEST message the NG-RAN node shall store the received UE Aggregate Maximum Energy Rate (UE-AMER) in the UE context, and use the received UE Aggregate Maximum Energy Rate (UE-AMER) for all energy-constrained Non-GBR QoS flows for the concerned UE as specified in TS 23.501 [9];

8.3.X UE Context Modification

Figure illustrates an example of including UE-AMER IE in UE CONTEXT MODIFICATION REQUEST message.

If the UE Aggregate Maximum Energy Rate (UE-AMER) IE is included in the UE CONTEXT MODIFICATION REQUEST message, the NG-RAN node shall replace the previously provided UE Aggregate Maximum Energy Rate (UE-AMER) by the received UE Aggregate Maximum Energy Rate (UE-AMER) in the UE context;

use the received UE Aggregate Maximum Energy Rate (UE-AMER) for (energy-constrained) Non-GBR QoS flows for the concerned UE as specified in TS 23.501 [9].

8.4.2 Handover Resource Allocation

Figure 6:
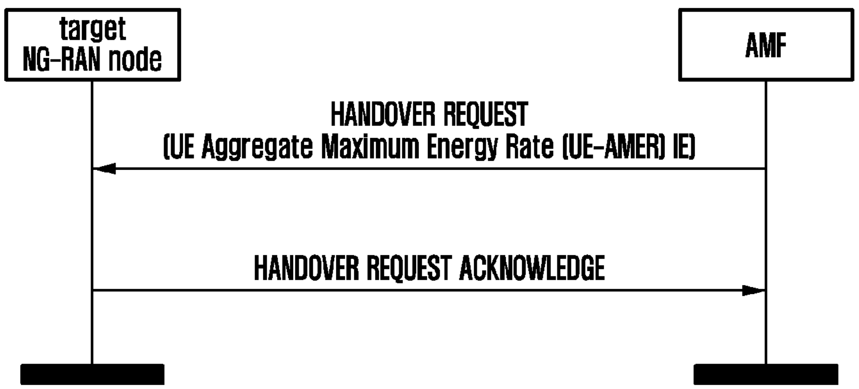
FIG. 6 illustrates an example of including UE-AMER IE in HANDOVER REQUEST message.
Figure 7:
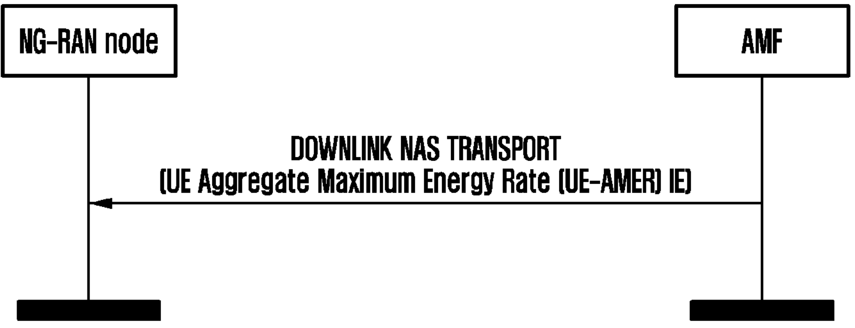
FIG. 7 illustrates an example of including UE-AMER IE in DOWNLINK NAS TRANSPORT message.

FIG. 6 illustrates an example on including UE-AMER IE in HANDOVER REQUEST message.

The AMF initiates the procedure by sending the HANDOVER REQUEST message to the target NG-RAN node.

Upon receipt of the HANDOVER REQUEST message the target NG-RAN node shall store the received UE Aggregate Maximum Energy Rate (UE-AMER) in the UE context, and use the received UE Aggregate Maximum Energy Rate (UE-AMER) for all energy-constrained Non-GBR QoS flows for the concerned UE as specified in TS 23.501 [9];

8.6.2 Downlink NAS Transport

Figure illustrates an example of including UE-AMER IE in DOWNLINK NAS TRANSPORT message.

The AMF initiates the procedure by sending a DOWNLINK NAS TRANSPORT message to the NG-RAN node.

The UE Aggregate Maximum Energy Rate (UE-AMER) IE should be sent to the NG-RAN node if the AMF has not sent it previously. If it is included in the DOWNLINK NAS TRANSPORT message, the NG-RAN node shall store the UE Aggregate Maximum Energy Rate (UE-AMER) in the UE context, and use the received UE Aggregate Maximum Energy Rate (UE-AMER) for all energy-constrained Non-GBR QoS flows for the concerned UE as specified in TS 23.501 [9].

9.3.1.xx UE Aggregate Maximum Energy Rate (UE-AMER)

This I is applicable for all energy-constrained Non-GBR QoS flows per UE which is defined for the downlink and the uplink direction and a subscription parameter provided by the AMF to the NG-RAN node.

| IE/Group Name | Presence | Range | IE type and reference | Semantics description |
|---|---|---|---|---|
| UE Aggregate Maximum Energy Rate | | 1 | | Applicable for energy-constrained Non-GBR QoS flows. |
| > UE Aggregate Maximum Energy Rate Downlink | M | | Energy Utilization Rate 9.3.x.x | This IE indicates the UE Aggregate Maximum Energy Rate as specified in TS 23.501 [9] in the downlink direction. |
| > UE Aggregate Maximum Energy Rate Uplink | M | | Energy Utilization Rate 9.3.x.x | This IE indicates the UE Aggregate Maximum Energy Rate as specified in TS 23.501 [9] in the uplink direction. |

9.3.1.xy PDU Session Aggregate Maximum Energy Rate (Session-AMER)

This IE is applicable for all energy-constrained Non-GBR QoS flows per PDU session which is defined for the downlink and the uplink direction and is provided by the SMF to the NG-RAN node.

| IE/Group Name | Presence | Range | IE type and reference | Semantics description |
|---|---|---|---|---|
| PDU Session Aggregate Maximum Energy Rate | | 1 | | Applicable for energy-constrained Non-GBR QOS flows. |
| > PDU Session Aggregate Maximum Energy Rate Downlink | M | | Energy Utilization Rate 9.3.x.x | Indicates the PDU Session Aggregate Maximum Energy Rate as specified in TS 23.501 [9] in the downlink direction. |
| > PDU Session Aggregate Maximum Energy Rate Uplink | M | | Energy Utilization Rate 9.3.x.x | Indicates the PDU Session Aggregate Maximum Energy Rate as specified in TS 23.501 [9] in the uplink direction. |

9.3.1.yy UE Slice-Maximum Energy Rate (UE-Slice-MER) List

This IE contains the UE Slice-Maximum Energy Rate (UE-Slice-MER) List as specified in TS 23.501 [9].

| IE/Group Name | Presence | Range | IE type and reference | Semantics description |
|---|---|---|---|---|
| UE Slice-Maximum Energy Rate Item | | 1 . . . < maxnoofAllowedS-NSSAIs> | | Applicable across all energy-constrained Non-GBR QoS flows. |
| > S-NSSAI | M | | 9.3.1.24 | |
| > UE Slice-Maximum Energy Rate Downlink | M | | Energy Utilization Rate 9.3.x.x | This IE indicates the downlink UE-Slice-MER as specified in TS 23.501 [9]. |
| > UE Slice-Maximum Energy Rate Uplink | M | | Energy Utilization Rate 9.3.x.x | This IE indicates the uplink UE-Slice-MER as specified in TS 23.501 [9]. |

| Range bound | Explanation |
|---|---|
| maxnoofAllowedS-NSSAIs | Maximum no. of allowed S-NSSAI. Value is 8. |

9.3.x.x Energy Utilization Rate

This IE indicates the amount of Energy (per bit) delivered by NG-RAN in UL or to NG-RAN in DL or by, divided by the duration of the period. It is used, for example, to indicate the maximum energy utilization rate for energy-constrained non-GBR QoS flow.

| IE/Group Name | Presence | Range | IE type and reference | Semantics description |
|---|---|---|---|---|
| Energy Utilization Rate | M | | INTEGER (0 . . . FFS, . . .) | The unit is: (e.g., joule/bit) |

TS 38.300:

| | |
|---|---|
| 10.x | Energy utilization Rate |
| 10.5.x | Downlink |

In downlink, energy-constrained non-GBR flows, the gNB provides that the UE-AMER is not exceeded. When received and supported, the gNB in addition provides that the UE-Slice-MER is not exceeded as specified in TS 23.501 [3].

| | |
|---|---|
| 12 | QoS |
| 12.1 | Overview |

In addition, an Aggregate Maximum Energy Rate is associated to each PDU session (Session-AMER), to each UE (UE-AMER) and to each slice per UE (UE-Slice-MER). The Session-AMER limits the aggregate energy utilization rate that can be expected to be provided across all Energy Constrained Non-GBR QoS Flows corresponding to a specific PDU Sessions and is ensured by the UPF. The UE-AMER limits the aggregate energy utilization rate that can be expected to be provided across all Energy Constrained Non-GBR QoS Flows of a UE and is ensured by the RAN. The UE-Slice-MER limits the energy utilization rate that can be expected to be provided across all Energy Constrained Non-GBR QoS Flows corresponding to PDU Sessions of the UE for the same slice (S-NSSAI) as specified in TS 23.501 [3] and is ensured by the RAN.

ALTERNATIVES AND EQUIVALENTS

Although a preferred embodiment has been shown and described, it will be appreciated by those skilled in the art that various changes and modifications might be made without departing from the scope of the invention, as defined in the appended claims and as described above.

REFERENCES

[1] Please refer to RP-220297 for detailed scope of the SI.
[2] TR 32.972, Study on system and functional aspects of energy efficiency in 5G networks (Release 17)
[2] 3GPP TS 38.413, Technical Specification Group Radio Access Network; NG-RAN; NG Application Protocol (NGAP) (Release 17)
[3] 3GPP TS 38.331, Technical Specification Group Radio Access Network; NR; Radio Resource Control (RRC) protocol specification (Release 17)
[4] 3GPP TS 38.423, Technical Specification Group Radio Access Network; NG-RAN; Xn application protocol (XnAP) (Release 17)
[5] 3GPP TS 36.423, Technical Specification Group Radio Access Network; Evolved Universal Terrestrial Radio Access Network (E-UTRAN); X2 application protocol (X2AP) (Release 17)
[6] 3GPP TS 23.501
[7] 3GPP, Network Data Analytics Service (NWDAF)
[8] SP-220446 New SID: Study on Energy Efficiency as service criteria
[9] R1-2205694 TR 38.864 skeleton for study on network energy savings for NR
[l] 3GPP TR 21.905: "Vocabulary for 3GPP Specifications".
[m] LS "LS on Energy Efficiency as guiding principle for new solutions", Sent TSG SA #94e 12.21 (SP-211621), Received SA1 #97e 02.22 S1-220063.
https://ftp.3gpp.org/tsg_sa/TSG_SA/TSGS_94E_Electronic_2021_12/Docs/S P-211621.zip
[x] SP-211621/S1-220063 "LS on Energy Efficiency as guiding principle for new solutions", Sent TSG SA #94e 12.21, Received SA1 #97e 02.22.

Definitions

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term “comprising” or “comprises” means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a first core network entity in a communication system, the method comprising:

receiving, from a second core network entity, information on a policy; and transmitting, to a base station, the information on the policy, wherein the policy comprises information on a maximum energy utilization rate for at least one best effort service, and wherein the policy instructs the base station to monitor energy utilization.

2. The method of claim 1, wherein a best effort service is a service that is not associated with quality of service (QoS) criteria.

3. The method of claim 1, wherein, in case that an energy utilization rate has exceeded the maximum energy utilization rate for services, a latency associated with a service received by a terminal is increased.

4. The method of claim 1, wherein the policy comprises at least one criteria of the best effort service or energy constraints associated with service delivery.

5. The method of claim 1, wherein the policy instructs the base station to enforce the policy.

6. The method of claim 1, wherein the first core network entity is an access and mobility management function (AMF), and wherein the second core network entity is a policy control function (PCF).

7. A first core network entity in a communication system, the first core network entity comprising:

a transceiver; and at least one processor coupled with the transceiver and configured to:

receive, from a second core network entity, information on a policy, and transmit, to a base station, the information on the policy, wherein the policy comprises information on a maximum energy utilization rate for at least one best effort service, and wherein the policy instructs the base station to monitor energy utilization.

8. The first core network entity of claim 7, wherein a best effort service is a service that is not associated with quality of service (QoS) criteria.

9. The first core network entity of claim 7, wherein, in case that an energy utilization rate has exceeded the maximum energy utilization rate for services, a latency associated with a service received by a terminal is increased.

10. The first core network entity of claim 7, wherein the policy comprises at least one criteria of the best effort service or energy constraints associated with service delivery.

11. The first core network entity of claim 7, wherein the policy instructs the base station to enforce the policy.

12. The first core network entity of claim 7, wherein the first core network entity is an access and mobility management function (AMF), and wherein the second core network entity is a policy control function (PCF).

* * * * *